Sept. 25, 1962 R. S. BROWN 3,055,072
TUBING CLAMP
Filed May 3, 1960
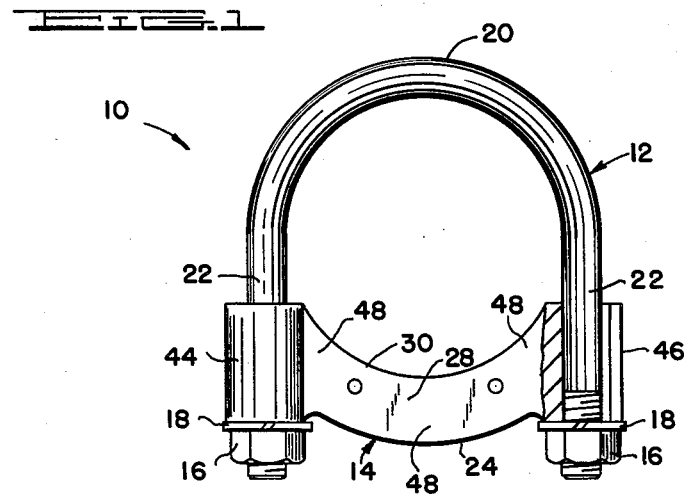
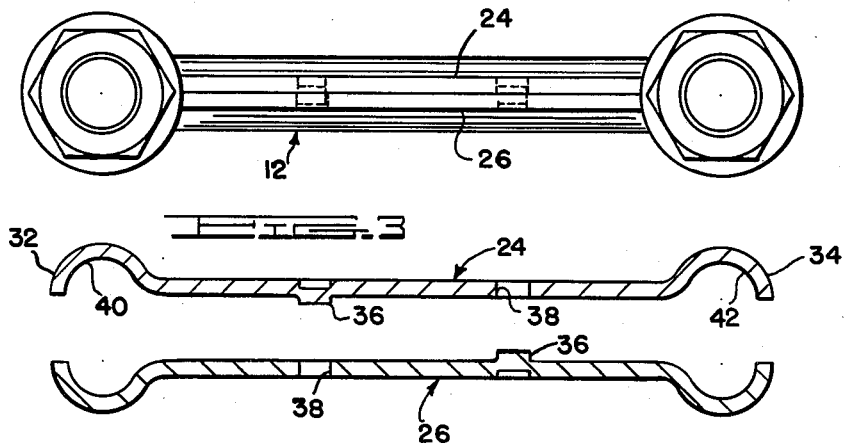
INVENTOR.
ROBERT S. BROWN
BY
FINN G. OLSEN
ATTORNEY

United States Patent Office 3,055,072
Patented Sept. 25, 1962

3,055,072
TUBING CLAMP
Robert S. Brown, 2601 Sylvan Road, Rte. 2,
Chelsea, Mich.
Filed May 3, 1960, Ser. No. 26,473
3 Claims. (Cl. 24—277)

The present invention relates to tubing clamps, and more particularly to the saddle portions of such clamps whereby improved manufacturing techniques can be employed and a more sturdy and superior product will result.

It is an object of the present invention to provide a tubing clamp having a saddle formed of two sheet metal sections of identical construction, thereby reducing manufacturing costs, and wherein said sections have complementary mating portions adapted to be fitted together during the manufacturing of the saddle to assure proper alignment of the sections when welding them together.

It is another object of the present invention to provide a tubing clamp having a saddle of the foregoing character wherein the male mating portions are integral parts respectively of the sheet metal material of the sections, and such male mating portions fit respectively into corresponding holes defined by female portions in the adjacent surfaces of the sections, thereby strengthening such saddle against shear stresses tending to break the weld joints between the sections.

It is still another object of the present invention to provide an improved tubing clamp of the foregoing character wherein said sheet metal sections define sleeve-like portions for receiving the ends of a U-bolt and wherein each sleeve-like portion is welded together so as to form a rigid unitary structure characterized by its strength.

Other objects of this invention will appear in the following description and appended claims, reference being had to the accompanying drawings forming a part of this specification wherein like reference characters designate corresponding parts in the several views.

In the drawings:

FIGURE 1 is a front elevation of a tubing clamp embodying the present invention and with a portion of the saddle broken away;

FIGURE 2 is an enlarged bottom view of the tubing clamp illustrated in FIGURE 1; and FIGURE 3 is an enlarged longitudinal section taken through the male and female mating portions of the saddle and showing the sections separated as they would be immediately prior to being fitted together for welding purposes.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawing, the illustrated embodiment of the invention will be described in greater detail.

The tubing clamp 10 includes the U-bolt 12, the saddle 14, the nuts 16 and when desired, the lock washers 18. The U-bolt 12 is a conventional type having a semi-circular portion 20 terminating in tangential parallel arms 22 having their remote ends threaded for receiving the nuts 16.

The saddle 14 is formed of two sheet metal stampings 24 and 26 which are identically the same and are interchangeable. This can be seen with respect to FIG. 3 if it will be assumed that one of the sections is rotated 180 degrees in the plane of the drawing. Therefore, only section 24 will be described in detail and it will be understood that section 26 is constructed the same.

Section 24 has a midportion 28, the one edge 30 of which is a circular arc of substantially the same radius as the semi-circular portion 20 of the U-bolt 12, and the circular arc does not have a circumferential length of more than 180 degrees. Symmetrically positioned with respect to the opposite ends 32 and 34 are the male and female portions 36 and 38, respectively. These portions may be formed by a punching operation wherein a complete blank (not shown) can be removed at 38 so as to form the hole shown, while at the portion 36 a punch displaces metal from the sheet metal stock only to a limited extent. The punches used for this operation are of such size that the external dimensions of the portion 36 conforms to the internal dimensions of hole at the portion 38.

The opposite ends 32 and 34 have semi-circular channels 40 and 42 which open in the same direction in which the male portion 36 projects. Thus, the section 26 can be placed in a reversed position with respect to the section 24, as is shown in FIGURE 3, and the sections can then be pressed together with the male portion 36 of each section penetrating the female portion 38 of the other section. This disposition of the parts will also provide two sleeve-like portions 44 and 46, FIGURE 1, through which the arms 22 extend.

The mating relation of the male and female portions 36 and 38 of the two sections 24 and 26 assures proper alignment of the sections in preparation for spot welding them together at the locations 48, FIGURE 1. The male and female portions 36 and 38 in addition provide a means of strengthening the saddle 14 against shear forces tending to shift one of the sections relative to the other, thereby relieving the welds at 46 from the necessity of performing this function by themselves.

In addition to spot welding at the locations 48, the sections 24 and 26 are also butt welded together at the outer abutting edges of the sleeve-like portions 44 and 46 and resistance welded together at the diametrically opposite inner abutting surfaces of the sections 24 and 26 adjacent the sleeve-like portions 44 and 46. Thus, the sleeve like portions 44 and 46 define integral barrel structures which are very rigid and sturdy. It is found that the sleeve-like portions 44 and 46, when welded in this manner, are sufficiently strong so that if the nuts 16 are screwed excessively tight on the threaded portions of the U-bolt 20, the U-bolt will rupture before the sleeve-like portions 44 and 46 split or otherwise fail.

Thus, it can be understood that the saddle disclosed herein is constructed and arranged so that it can be manufactured at a low-cost by forming the saddle from two sections of identical construction, the sections of the saddle having means thereon for establishing and maintaining proper alignment of the sections when being secured together and thereafter for providing a more rigid and sturdy construction.

Having thus described my invention, I claim:

1. An external clamp for securing telescoped metal tubes together comprising a U-bolt having a semi-circular portion and parallel spaced tangential arms integral therewith, a saddle for said U-bolt formed of two identical sheet metal stampings secured together, each stamping having a generally flat midportion with one longitudinal edge extending circumferentially in an arc of not more than one hundred eighty degrees and being complementary to the semi-circular portion of said U-bolt, said midportion having male and female portions in one surface thereof symmetrically located with respect to the opposite ends of the stamping, the opposite ends having parallel sem-circular channels opening in the direction of said one surface so that two parallel sleeve-like portions are provided which receive said arms when the stampings are secured together with the male and female portions thereof mated together, said male portion being a projection partially deflected out of the material of said midportion and said female portion defining a hole of a dimension corresponding to the transverse cross section of said male portion, and nuts threadedly connected to the ends of said arms.

2. As an article of manufacture, a saddle for use with a U-bolt having nuts threadedly connected to the ends of the arms of the U-bolt, said saddle comprising two identical sheet metal stampings secured together with common surfaces in abutting relationship, each stamping having a flat midportion with one longitudinal edge extending in a concave arc of not more than one hundred eighty degrees, said midportion having male and female portions in its abutting surface symmetrically located with respect to the opposite ends of the stamping, the opposite ends having parallel semi-circular channels opening in the direction of their associated abutting surface so that two parallel sleeve-like portions are provided for receiving said arms when the stampings are secured together with the male and female portions thereof mated together, the male portion of each stamping being a projection partially deflected out of the material forming the stamping and the female portion of each section defining a hole of a dimension corresponding to the transverse cross section of said male portion.

3. An article of manufacture as claimed in claim 2 wherein the semi-circular channels of each stamping have free straight edges at their extremities and are joined to their associated semi-circular channels along their free straight edges.

References Cited in the file of this patent
UNITED STATES PATENTS

| | | |
|---|---|---|
| 2,632,894 | Louis | Mar. 31, 1953 |
| 2,719,345 | Riker | Oct. 4, 1955 |
| 2,979,554 | Maitland | Apr. 11, 1961 |